Oct. 25, 1938.　　　W. J. GUYER　　　2,134,184
SHEET MATERIAL GAUGING MACHINE
Filed Sept. 30, 1937
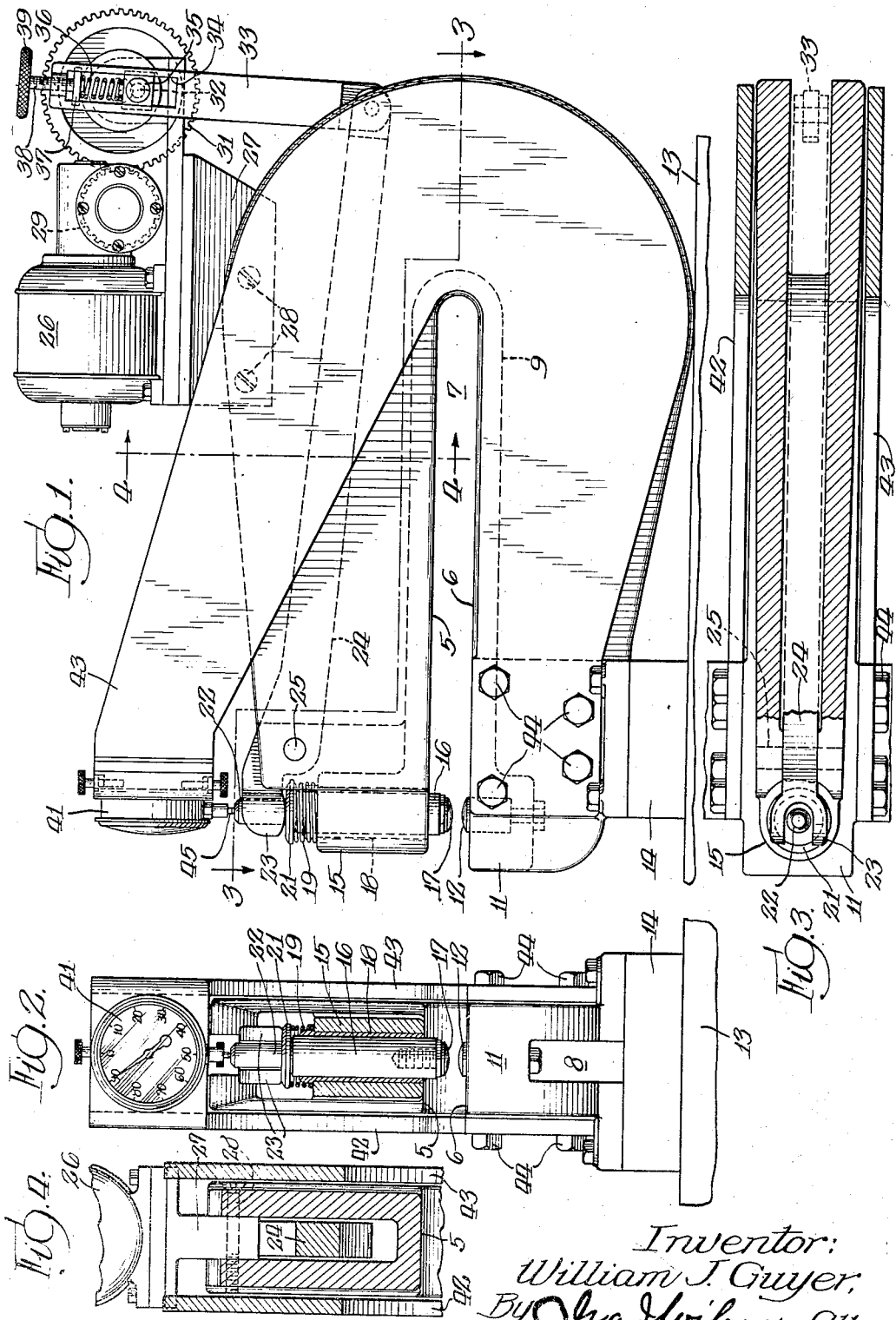
Inventor:
William J. Guyer,
By Ira J. Wilson Atty.

Patented Oct. 25, 1938

2,134,184

UNITED STATES PATENT OFFICE 2,134,184

SHEET MATERIAL GAUGING MACHINE

William J. Guyer, Chicago, Ill., assignor to Guyer Metal Products Corporation, Chicago, Ill., a corporation of Illinois Application September 30, 1937, Serial No. 166,543

9 Claims. (Cl. 33—147)

This invention relates to machines for gauging or measuring the thickness of materials, and while the principles thereof may be embodied in machines for gauging materials of various characters and thicknesses, the machine here shown for illustrative purposes is designed particularly for gauging sheet materials and is especially adapted for gauging sheet metals of various kinds.

It is essential that metal sheets which are to be fabricated into products, and particularly where the fabrication involves a drawing process, be of predetermined and uniform thickness. Whether or not the stock sheets meet the dimensional requirements is determined by gauging or measuring the thickness of the sheets not only along the margins but at or near the center and at various intermediate points.

One of the purposes of my present invention, therefore, is to provide a gauging machine which is adapted to accommodate large sheets and enable the thickness thereof to be measured at points quite remote from the edges.

In order to support and maintain the sheet contacting elements between which the sheet to be measured is inserted, in proper relation and alignment, these elements are mounted on a body or frame which must be constructed to receive and accommodate sheets of the size required to be gauged. The body or frame structure is accordingly made of substantially U shape, and the sheet contacting elements are mounted at or near the ends of the legs of such body. Under the influence of the pressure applied to the movable sheet contacting element for the purpose of forcing the same against the surface of the sheet to be measured, the body, even when of integral construction, will spring slightly under the strains imposed, thereby producing a slight variation in distance between the ends of the legs by which the contact elements are supported. If, as has heretofore been customary, the indicating instrument which indicates the thickness of the sheet being measured is mounted upon the upper leg of the body, the indicator will partake of the springing movements of the body or leg, thereby varying the distance between the indicator and the stationary sheet contacting element. Such movement of the indicator will produce an error in the thickness indication given by the instrument. Such an error is obviously of grave importance where the allowable thickness tolerances are slight, and gauge accuracy therefore assumes great importance.

Another and very important purpose of my present invention is to obviate the errors above pointed out in the reading of the indicator by so mounting the indicator that it will always remain in predetermined fixed relation with respect to the stationary die or sheet contacting element and will not be affected or influenced by any relative movement between the legs of the machine body induced by strains imposed thereon in operation or otherwise caused.

Another object of my invention is to provide a machine which will be automatic in operation to the extent at least that the sheet contacting elements are automatically and intermittently brought into gauging contact with the interposed sheet to be measured, so that the operator need only be concerned with moving the sheet about to present a new area in a position to be measured between the successive actuations of the movable contacting element or die and with reading the indicator when the dies are in contacting or measuring position.

In addition, my invention aims to provide an observation period during which the dies remain quiescent in contacting or measuring relation with the sheet a sufficient length of time to enable the operator to make an accurate reading of the indicator.

My invention also contemplates provision for regulating the pressure to which the sheet is subjected between the contacting dies, this regulation being effected through manipulation of an adjusting device to accommodate the die movements to variations in thickness and variations in character of the sheets to be gauged.

Other objects and many of the inherent advantages of my invention should be readily appreciated as the same becomes better understood by reference to the following description when considered in connection with the accompanying drawing.

Referring to the drawing:

Fig. 1 is a side elevation of a gauging machine constructed in accordance with my invention;

Fig. 2 is an end elevation thereof partially in section looking toward the right at Fig. 1;

Fig. 3 is a sectional view on the line 3—3 of Fig. 1; and

Fig. 4 is a fragmentary sectional view on the line 4—4 of Fig. 1.

Referring now to the drawing more in detail, it will be observed that the frame or body structure of the machine is substantially U-shaped, comprising the upper and lower legs 5 and 6 spaced apart to provide the intervening space 7 adapted to receive and accommodate one-half, at least, of a sheet of very substantial width. This frame or body is of integral construction, preferably cast steel or iron and for purposes of lightness and for economy in production, it is provided with a groove 8 extending inwardly from the outer face of the body substantially to the depth indicated by dotted line 9 in Fig. 1, the depth of the groove in the lower leg 6 being diminished near the end of this leg to provide a substantial block 11, in which the stationary sheet contacting element or die 12 is stationarily mounted, and the end of the groove in the upper leg 5 being terminated short of the end of this leg. The rear end of the body rests upon a suitable support 13, and the forward end of leg 6 is supported upon a base or block 14 so as to dispose the opposed faces of the legs 5 and 6 in substantial horizontal position.

The forward end of leg 5 is shaped to provide a cylindrical, vertically disposed anvil guide and support 15 in which the movable die or contacting element 16, equipped with the hardened end piece 17, is mounted to reciprocate. A sleeve or bushing 18 is interposed between the guide 15 and the anvil 16 for guiding and bearing purposes, this bushing being renewable if necessary as the result of wear. An expansion spring 19 interposed between the supporting guide 15 and a flanged head 21 formed on the die 16 normally urges this die upwardly into the retracted position illustrated on the drawing. A reduced portion of the die providing a spindle 22 projects above the flanged head 21, and is disposed between the bifurcations 23 of a lever 24, disposed in the previously described groove of the body and fulcrumed upon a transversely extending pintle 25. Through the instrumentality of this lever, the movable die 16 is intermittently brought into cooperation with the stationary die 12 so that an interposed sheet to be gauged will be firmly contacted by and in effect clamped between these dies.

The lever 24 is automatically and intermittently actuated to depress the die 16 by means of a motor 26 carried by base 27, which is mounted by bolts 28 in the groove of the body. Through suitable driving mechanism including the pinion 29 and the driven gear 31, rotary motion is imparted to a crank pin 32 rigidly connected with gear 31 and operatively connected through link 33 with lever 24. Each revolution of crank pin 32 will induce through lever 24 a complete reciprocatory cycle of die 16.

For the purpose of providing a dwell in the cycle of the reciprocatory die which affords an observation period during which the operator may read the indicator, I have provided a yielding connection between the crank pin 32 and the link 33. The link 33 is provided as shown in Fig. 1 with an elongated slot 34 in which a block 35, carried by the crank pin 32, is adapted to reciprocate. A spring 36 interposed between the block and an adjustable abutment 37, regulatable by a screw 38, threaded through the upper end of the link, affords a yieldable connection between the crank pin and the link. On the upstroke of the crank pin, the long arm of lever 24 will be carried upwardly until the pressure of the movable die upon the sheet being measured exceeds the resistance of spring 36, whereupon during the travel of the crank pin 32 in an arc of substantial length at the top of its orbit, the movable die 16 will remain stationary and in contact with the sheet being measured for a substantial period during which the indicator may be observed.

By adjustment of the screw 38 through the knurled hand grip 39, the tension of spring 36 may be regulated to vary the pressure of the movable die upon the stock being gauged in conformity with the thickness and character of said stock.

For accuracy in gauging, the pressure of the movable die upon the stock must be quite substantial, and for this reason, the power multiplication by lever 24 is, as will be apparent from the proportions of its arms, quite substantial. The stresses imposed upon the body by the operation of the lever tends to induce a springing of the upper leg of the body away from the lower leg, and if the indicator, as has heretofore been customary, were mounted upon this upper leg, it would partake of these movements with resultant inaccuracies in its indications. To obviate such inaccuracies, the indicator, in accordance with my invention, is so mounted that it is unaffected by any movements of the upper leg of the body.

The indicator designated 41, which may be of any well-known or preferred type, is carried by the upper ends of two substantially V shaped arms 42 and 43 respectively which conform in a general way to the contour of the body and are rigidly secured at their lower ends by bolts 44 or the like to the lower leg of the frame in close proximity to and rigid with the stationary anvil. Except at their forward lower ends where these arms are mounted, they are spaced from and out of contact with the body, and consequently are unaffected by any springing movements of the body. The indicator, as is customary, includes a plunger or rod 45 which rests upon the upper end of the movable die spindle 22, so that the position of this spindle is at all times shown on the indicator dial by the indicator hand or pointer, and the movements of the die are likewise shown by the indicator. Since the indicator is supported by arms which are independent of and free from the upper leg of the body, it will be apparent that the indicator is at all times maintained in fixed relation to the stationary die and is not subject to inaccuracies occasioned by springing movements of the body or upper leg of the machine occasioned by the operation of the pressure lever.

In the operation of my machine, the motor is started to thereby through the lever 24 intermittently depress the movable anvil 16 into firm contact with the sheet interposed between the movable and stationary anvils. The position of the movable anvil will remain unchanged during the travel of the crank pin 32 through a substantial arc so as to afford an opportunity for observation of the indicator by the operator at which time the indicator pointer will remain stationary. The indicator, therefore, will afford an accurate reading of the thickness of the sheet being gauged, which reading will not be rendered inaccurate or influenced in any way by any yielding or springing movements of the body resulting from the operation of the machine.

While a preferred embodiment of my invention has been illustrated and described, it should be manifest that the structural details thereof are capable of considerable modification and variation without departing from the essentials of the invention as defined in the following claims:

1. In a gauging machine, the combination of a body having opposed end portions, a stationary anvil and a movable anvil mounted in cooperative relation on the end portions respectively of said body, means mounted upon the end portion of the body on which the movable anvil is mounted for actuating said movable anvil, an indicator arranged to indicate movements of said movable anvil, and means unconnected with and spaced from the movable anvil supporting end portion of the body for supporting said indicator in fixed relation to said stationary anvil irrespective of movements of said last mentioned end portion relatively thereto.

2. In a gauging machine, the combination of a substantially U shaped, integrally formed body provided with an inwardly extending groove extending substantially throughout the length of the body, a stationary anvil mounted on one leg of said body, a movable anvil mounted on the other leg of said body, a lever fulcrumed on said last mentioned leg and disposed throughout the greater part of its length in said groove, one arm of said lever being positioned to actuate said movable anvil, a motor mounted on said body, means driven by said motor for actuating said lever, an indicator, and means for supporting said indicator in fixed position with respect to the stationary anvil supporting leg of said body and free from the influence of movements of the other leg of said body induced by actuations of said lever.

3. In a gauging machine, the combination of a substantially U shaped body provided with a peripheral, inwardly extending groove, a stationary and a movable anvil mounted respectively on the lower and upper legs of said body, a lever fulcrumed on said upper leg and disposed within said groove, an indicator positioned in cooperative relation to said movable anvil, means for supporting said indicator in fixed relation to said stationary anvil, and means for intermittently actuating said lever to cause the exertion of a predetermined pressure by said movable anvil, said means including a yieldable lost motion connection permitting a dwell in the movement of said movable anvil under pressure of said lever to afford an observation period for the reading of said indicator.

4. In a gauging machine, the combination of a body, a movable and a stationary anvil mounted thereon, an indicator in cooperative relation to said movable anvil, a lever for actuating said movable anvil, and means for intermittently operating said lever including a yieldable lost motion connection permitting a dwell in the movement of said lever while under stress, thereby affording an observation period for reading said indicator.

5. In a gauging machine, the combination of an integral substantially U shaped body provided with a peripheral, inwardly extending groove, a stationary anvil carried by the lower leg of said body, a movable anvil carried by the upper leg of said body, an indicator, a pair of plates rigidly attached to the outer faces of said lower leg in proximity to said stationary anvil and extending above the upper leg of said body to support said indicator in cooperative relation to said movable anvil, a lever fulcrumed on the upper leg of said body and disposed throughout the greater portion of its length within said groove, said movable anvil being provided with a peripheral shoulder against which one arm of said lever abuts, and means for actuating said lever, said means including a yieldable lost motion connection.

6. A gauging machine having a U shaped body, a stationary anvil mounted at the outer end of one leg of said body, a movable anvil slidably mounted at the outer end of the other leg of said body, means carried by said movable anvil leg for actuating said movable anvil, an indicator for indicating movements of the movable anvil, and means fixed to the stationary anvil leg and free from the movable anvil leg for supporting said indicator in predetermined relation to the movable anvil so as to be uninfluenced by movements of the movable anvil leg.

7. A gauging machine comprising a body having spaced apart legs to accommodate between them the material to be gauged, a stationary anvil and a movable anvil mounted on the ends of said respective legs, means carried by the movable anvil leg for actuating the movable anvil, an indicator arranged to indicate movements of said movable anvil, and means free from engagement with the movable anvil leg for supporting said indicator in fixed relation to the stationary anvil irrespective of movements of said movable anvil leg.

8. In a gauging machine, the combination of a body, a stationary anvil and a movable anvil mounted on said body, an indicator constructed and arranged to indicate the position of the movable anvil relatively to the stationary anvil, a motor, and operative connections between said motor and said movable anvil for actuating the movable anvil, including a yieldable element permitting a dwell in the movable anvil movement for indicator observation purposes.

9. In a gauging machine, the combination of an integral, substantially U shaped body, a stationary anvil carried by one leg of said body, a movable anvil carried by the other leg of said body, an indicator, means rigidly attached to said one leg in proximity to said stationary anvil and extending in proximity but out of contact with said other leg of said body for supporting said indicator in cooperative relation to said movable anvil, and means for actuating said movable anvil.

WILLIAM J. GUYER.